United States Patent
Woods

(10) Patent No.: US 7,523,912 B1
(45) Date of Patent: Apr. 28, 2009

(54) PIVOT BASE ASSEMBLY FOR TRAFFIC POLE

(75) Inventor: Raymond M. Woods, Edmond, OK (US)

(73) Assignee: Pelco Products, Inc., Edmond, OK (US)

(*) Notice: Subject to any disclaimer, the term of this patent is extended or adjusted under 35 U.S.C. 154(b) by 415 days.

(21) Appl. No.: 10/905,152

(22) Filed: Dec. 17, 2004

(51) Int. Cl.
*F16M 13/00* (2006.01)

(52) U.S. Cl. .................. 248/415; 248/548; 248/158; 248/521; 248/522; 248/349.1; 248/900; 403/52; 403/66; 403/119; 40/606.15; 40/606.14; 116/63 R; 384/494

(58) Field of Classification Search ............... 248/548, 248/158, 521, 522, 349.1, 900; 403/52, 66, 403/119; 40/606.15, 606.14; 116/63 R; 52/296, 29, 65, 726.1–726.4
See application file for complete search history.

(56) References Cited

U.S. PATENT DOCUMENTS

| | | | | |
|---|---|---|---|---|
| 158,610 | A | * | 1/1875 | Whitman .................. 414/449 |
| 1,254,305 | A | * | 1/1918 | Blakeslee ................ 116/63 R |
| 2,694,540 | A | * | 11/1954 | Pfaff, Jr. .................. 248/514 |
| 3,093,215 | A | * | 6/1963 | Scribens .................... 52/295 |
| 3,199,826 | A | * | 8/1965 | Miller et al. .............. 248/417 |
| 3,501,211 | A | * | 3/1970 | Molloy ...................... 384/580 |
| 3,645,057 | A | * | 2/1972 | Kaplan ........................ 52/295 |
| 3,713,262 | A | * | 1/1973 | Jatcko ........................... 52/98 |
| 3,936,026 | A | * | 2/1976 | Hampel et al. ........... 248/349.1 |
| 4,279,107 | A | | 7/1981 | Bollmann |
| 4,295,308 | A | | 10/1981 | Korfanta |
| 4,309,121 | A | * | 1/1982 | Salame ...................... 403/164 |
| 4,446,945 | A | | 5/1984 | Anderson |
| 4,549,714 | A | * | 10/1985 | Busch .................... 248/349.1 |
| 4,659,046 | A | | 4/1987 | Parduhn |
| 4,659,050 | A | * | 4/1987 | Tabayashi ................ 248/349.1 |
| 4,878,160 | A | | 10/1989 | Reneau et al. |

(Continued)

FOREIGN PATENT DOCUMENTS

AU      3816185      9/1985

(Continued)

OTHER PUBLICATIONS

Pelco Products, Inc., Project Submittal Drawings, public records of Virginia Department of Transportation, Richmond, Virginia, USA, published about Dec. 2001. (2 pages).

(Continued)

*Primary Examiner*—J. Allen Shriver, II
*Assistant Examiner*—Michael McDuffie
(74) *Attorney, Agent, or Firm*—Mary M. Lee

(57) ABSTRACT

A pivot assembly that can be retrofitted to existing traffic poles. The pivot assembly comprises a bearing assembly disposed between a top plate and a bottom plate. The bottom plate connects to the existing pole foundation with the standard anchor bolt arrangement. Similarly, the top plate connects to the base plate of the traffic pole using additional bolts. Bearings in the pivot assembly allow the pole to rotate relative to the foundation. Preferably, roller bearings are utilized, as these can be contained substantially within the pivot assembly without extending down into the foundation or up into the pole. This means the pivot assembly can be installed in existing, standard traffic poles and foundations without modifying either. The pivot assembly does not interfere with existing wiring or access openings.

36 Claims, 7 Drawing Sheets

U.S. PATENT DOCUMENTS

| | | | |
|---|---|---|---|
| 5,067,592 | A | 11/1991 | Miskin et al. |
| D328,243 | S | 7/1992 | Parduhn |
| D335,279 | S | 5/1993 | Parduhn |
| 5,299,111 | A | 3/1994 | Parduhn et al. |
| 5,381,323 | A | 1/1995 | Osteen et al. |
| 5,547,288 | A * | 8/1996 | Quinn et al. ............... 384/207 |
| D373,947 | S | 9/1996 | Parduhn |
| D379,756 | S | 6/1997 | Parduhn |
| 5,645,255 | A | 7/1997 | Parduhn |
| 5,772,172 | A | 6/1998 | Sampedro et al. |
| 5,779,309 | A * | 7/1998 | Lu ........................ 297/344.26 |
| 6,045,239 | A | 4/2000 | Waldmann |
| 6,204,446 | B1 | 3/2001 | Parduhn |
| 6,357,709 | B1 | 3/2002 | Parduhn |
| 6,454,461 | B1 * | 9/2002 | Lin ........................... 384/545 |
| 6,685,154 | B1 * | 2/2004 | Blyth et al. ................ 248/512 |
| 6,814,494 | B2 * | 11/2004 | Borowski et al. .......... 384/484 |
| 6,820,389 | B1 * | 11/2004 | Macchietto ................ 52/736.1 |

FOREIGN PATENT DOCUMENTS

| | | |
|---|---|---|
| AU | 2001189389 A1 | 5/2002 |
| JP | 2001277168 | 10/2001 |

OTHER PUBLICATIONS

Union Metal Corporation., Project Submittal Drawings, public records of Virginia Department of Transportation, Richmond, Virginia, USA, published Jan. 30, 1999. (1 page).

Northwest Signal Supply Company., Project Submittal Drawings, public records of Washing State Department of Transportation, Olympia, Washington, USA, published Nov. 20, 1998. (4 pages).

Nova Pole International, Inc. Advertisement for "The Revolver," IMSA Journal, vol. 40, No. 5, pp. 6,7 & 29, published Sep./Oct. 2002. (2 pages).

* cited by examiner ated generally by the reference numeral 10. The traffic control assembly 10 is designed for use with a grounded pole foundation, described more fully hereafter. The traffic control assembly 10 comprises a traffic pole 12 of conventional structure and design. As used herein, "traffic pole" refers to vertically-oriented poles used to support traffic control devices over or near roadways for affecting vehicular or pedestrian traffic, or both.

PIVOT BASE ASSEMBLY FOR TRAFFIC POLE

FIELD OF THE INVENTION

The present invention relates to traffic control devices generally and, more particularly but without limitation, to pivot mechanisms for traffic device poles.

BACKGROUND OF THE INVENTION

Traffic signals and other traffic control devices, such as signals, often are supported directly over the roadway, usually on a mast arm extending from a traffic pole at the roadside. This is a preferred location as the signals are easily visible to drivers. However, this location makes the repair and maintenance of such signals problematic for the service personnel and inconvenient for the driving public, as maintenance and repairs typically are performed only while the roadway is closed. The present invention provides a pivot assembly that can be installed at the base of the traffic pole. The pivot assembly permits the pole to be rotated so that the attached mast arm extends over the right-of-way or sidewalk rather than over the roadway.

SUMMARY OF THE INVENTION

The present invention comprises a pivot assembly for use with a traffic pole having a base plate supportable on a grounded pole foundation. The pivot assembly comprises a bottom plate nonmovably connectable to the pole foundation and a top plate nonmovably connectable to the base plate of the traffic pole. A bearing assembly is contained substantially between the bottom plate and the top plate so that, when the pivot assembly is installed between the base plate and the pole foundation, the traffic pole is rotatable relative to the pole foundation.

The present invention further comprises a traffic control assembly for use with a grounded pole foundation. The traffic control assembly comprises a pole having a pole base and a traffic control device supported on the pole. The traffic control assembly further comprises a pivot assembly including a bottom plate nonmovably connectable to the pole foundation and a top plate nonmovably connectable to the base plate of the traffic pole. A bearing assembly is contained substantially between the bottom plate and the top plate of the pivot assembly so that, when the pivot assembly is installed between the base plate and the pole foundation, the traffic pole is rotatable relative to the pole foundation.

Still further, the present invention comprises a pivot assembly for use with a traffic pole having a base plate and a pole foundation. The pivot assembly comprises a bottom plate nonmovably connectable to the pole foundation and a top plate nonmovably connectable to the base plate of the traffic pole. A roller bearing assembly is interposed between the bottom plate and the top plate, so that, when the pivot assembly is installed between the base plate and the pole foundation, the traffic pole is rotatable relative to the pole foundation.

In another aspect, the present invention comprises a traffic control assembly for use with a grounded pole foundation. The traffic control assembly comprises a pole having a pole base and a traffic control device supported on the pole. The traffic control assembly further comprises a pivot assembly including a bottom plate nonmovably connectable to the pole foundation and a top plate nonmovably connectable to the base plate of the traffic pole. A roller bearing assembly is interposed between the bottom plate and the top plate so that, when the pivot assembly is installed between the base plate and the pole foundation, the traffic pole is rotatable relative to the pole foundation.

DETAILED DESCRIPTION OF THE PREFERRED EMBODIMENT

Figure 1:
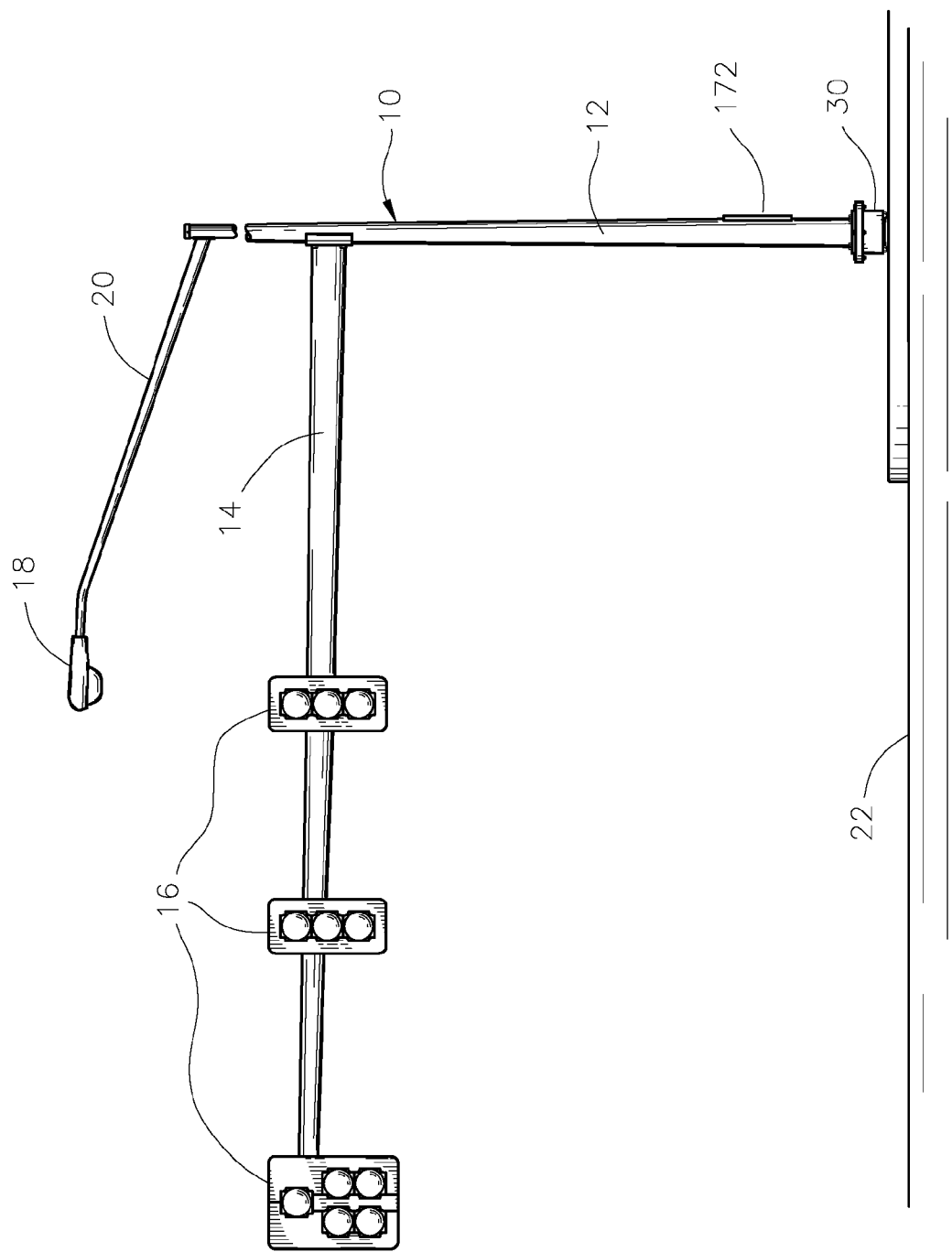
FIG. 1 is a side elevational, fragmented view of a traffic control assembly in accordance with the present invention. Traffic signals are supported on a mast arm extending horizontally from a vertical traffic pole adjacent to a roadway.

Turning now to the drawings in general and to FIG. 1 in particular, shown therein is a traffic control assembly desig- In a typical manner, a mast arm 14 extends outwardly or horizontally from the pole 12. One or more traffic control devices, such as the signals 16, are attached to the mast arm 14. A light 18, a type of traffic control device, is supported on a separate arm 20 also over the roadway 22 but above the signals 16. "Traffic control devices" means traffic signals, lights, signs and other devices for controlling the direction, flow and safety of automotive, railway and pedestrian traffic, as well as warning devices, such as lights, signs and horns for all forms of vehicular and pedestrian traffic. It will now be apparent that the traffic control assembly 10 of this invention, though illustrated herein in the context of a roadway for automobiles, is also applicable to railways and non-vehicular roads, sidewalks and the like.

Figure 2:
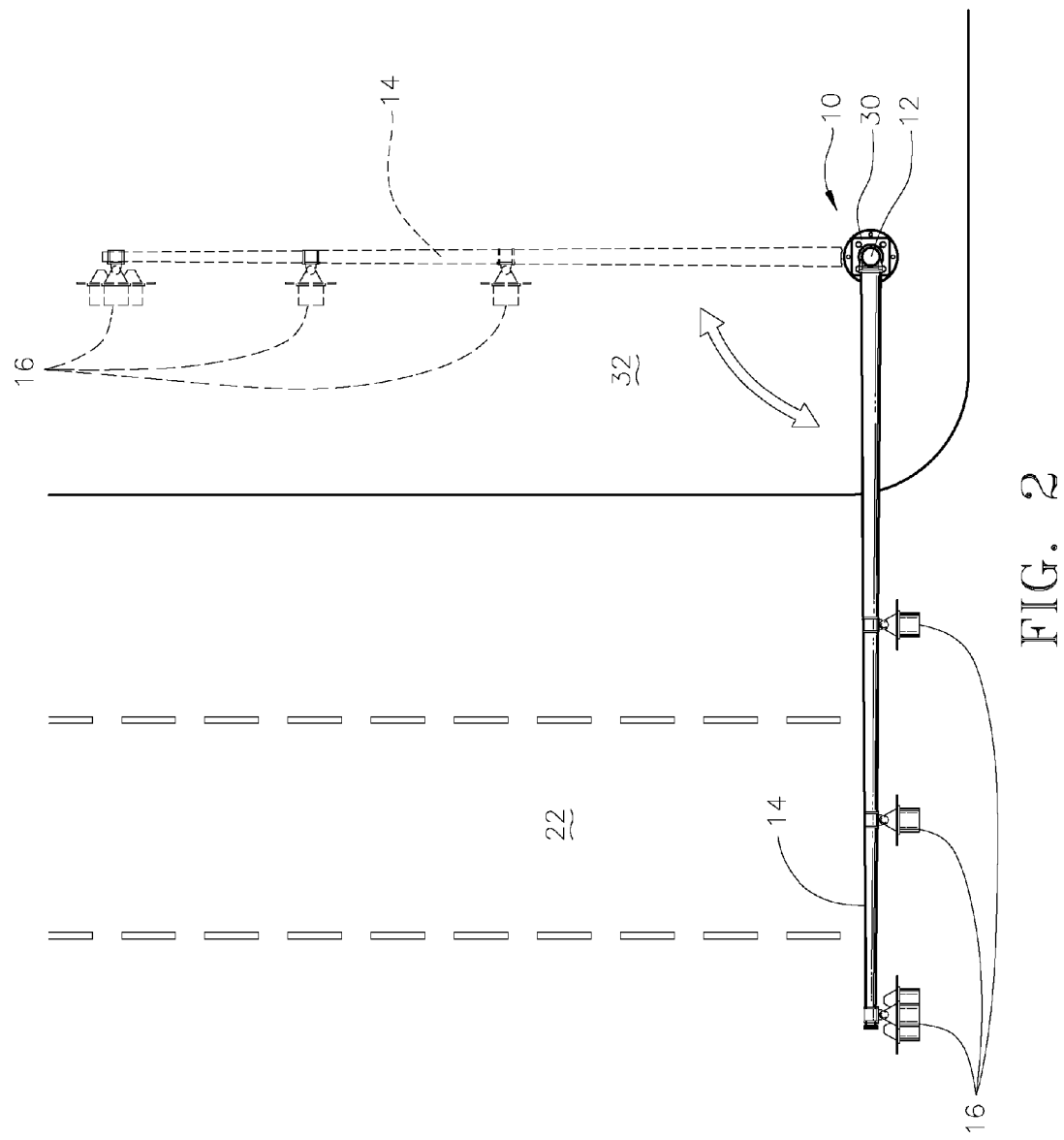
FIG. 2 is a plan view of the traffic control assembly in FIG. 1 and illustrates how the pivot assembly of this invention permits the mast arm to be pivoted from its operating position over the roadway (solid lines) to a service position adjacent the roadway (broken lines).

The traffic control assembly 10 of the present invention also comprises a pivot assembly 30 at the base of the pole 12. The operation of this pivot assembly 30 is illustrated in FIG. 2, to which attention now is directed. The operational position of the mast arm 14 and pole 12 is shown in solid lines, the mast arm extending out over the roadway 22. The servicing position of the mast arm 14 and pole 12 is shown in broken lines, with the mast arm and attached signals 16 now supported over the roadside 32 well away from the roadway 22.

Figure 3:
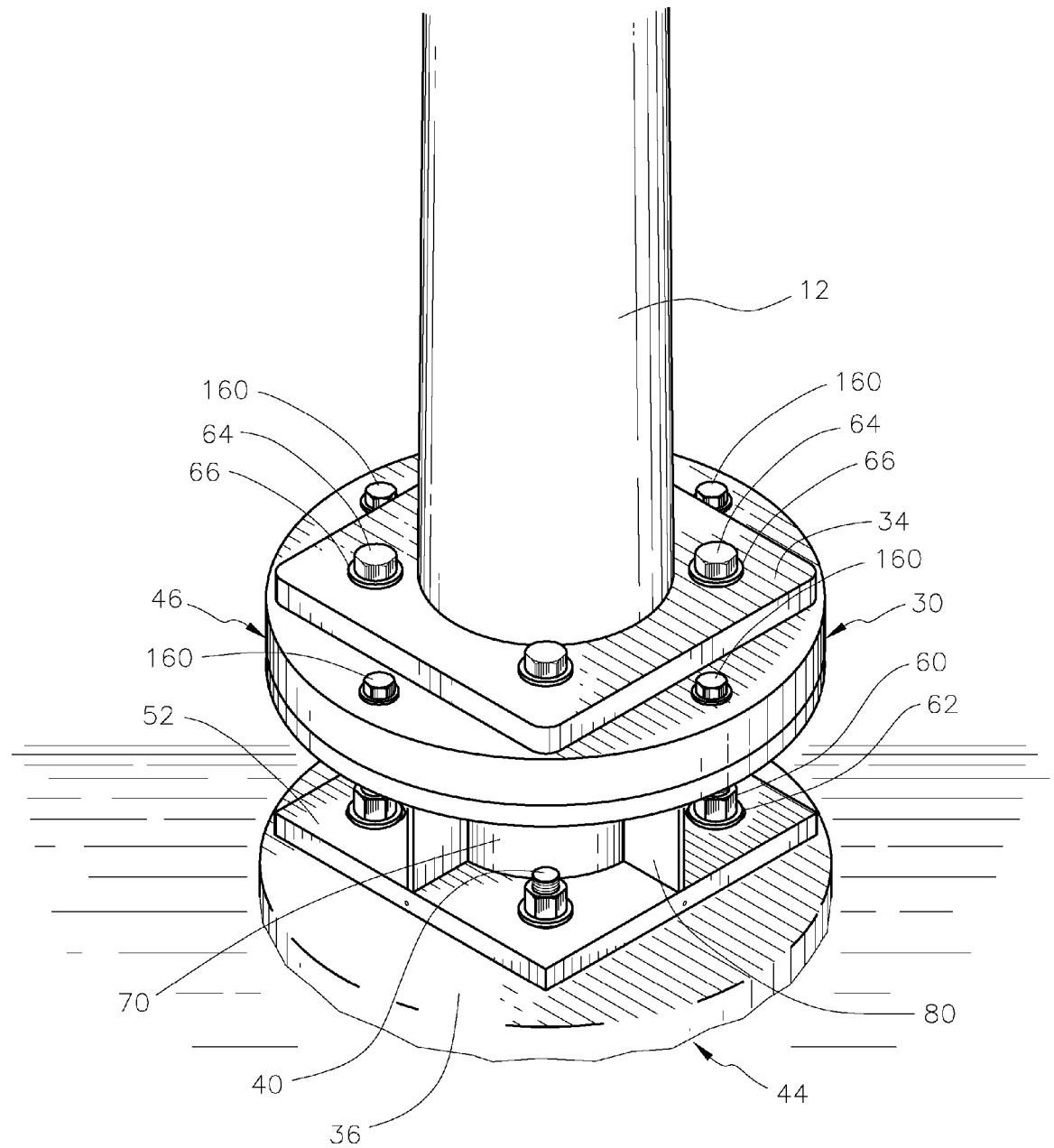
FIG. 3 shows a perspective view of the pivot assembly of this invention at the base of the traffic pole. The cover has been removed.

Turning now to FIG. 3, there is shown an enlarged view of the pivot assembly 30 installed at the base of the pole 12 between the base plate 34 of the pole 12 and the grounded foundation 36. The foundation 36 shown is a typical concrete footing with four upwardly extending anchor bolts 40 embedded therein, which is a common means for anchoring traffic poles. However, as used herein, the terms "grounded pole foundation" and "grounded foundation" refer to any sort of foundational structure embedded in, supported on or otherwise secured relative to the earth or other surface for supporting a traffic pole. Also, "bolts" as used in reference to the foundation is not limited to conventional anchor bolts.

Figure 4:
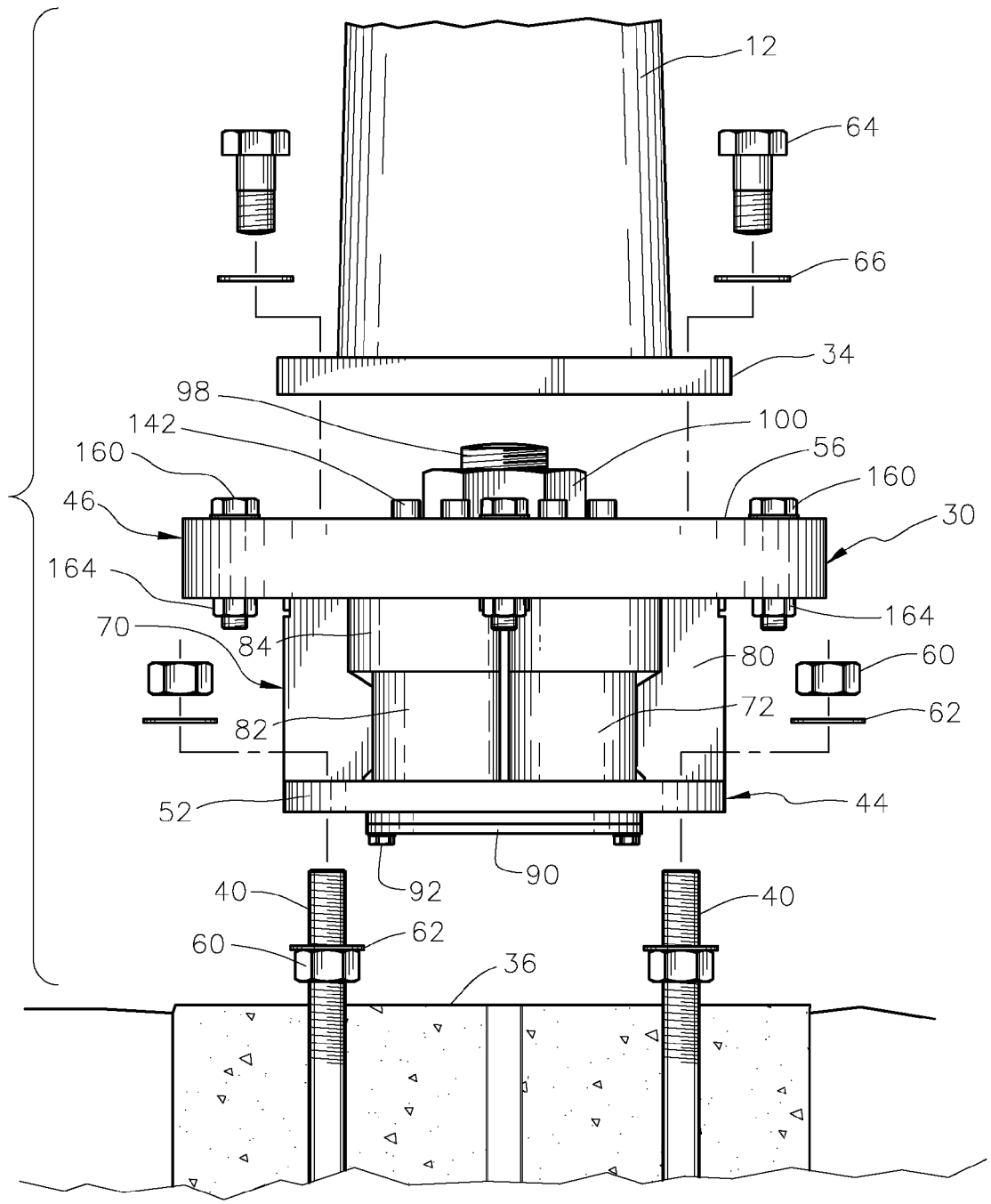
FIG. 4 shows a side elevational, partly exploded and partly fragmented view of the base of the traffic control assembly in FIG. 1 showing the pivot assembly between the base of the pole and the foundation.
Figure 5:
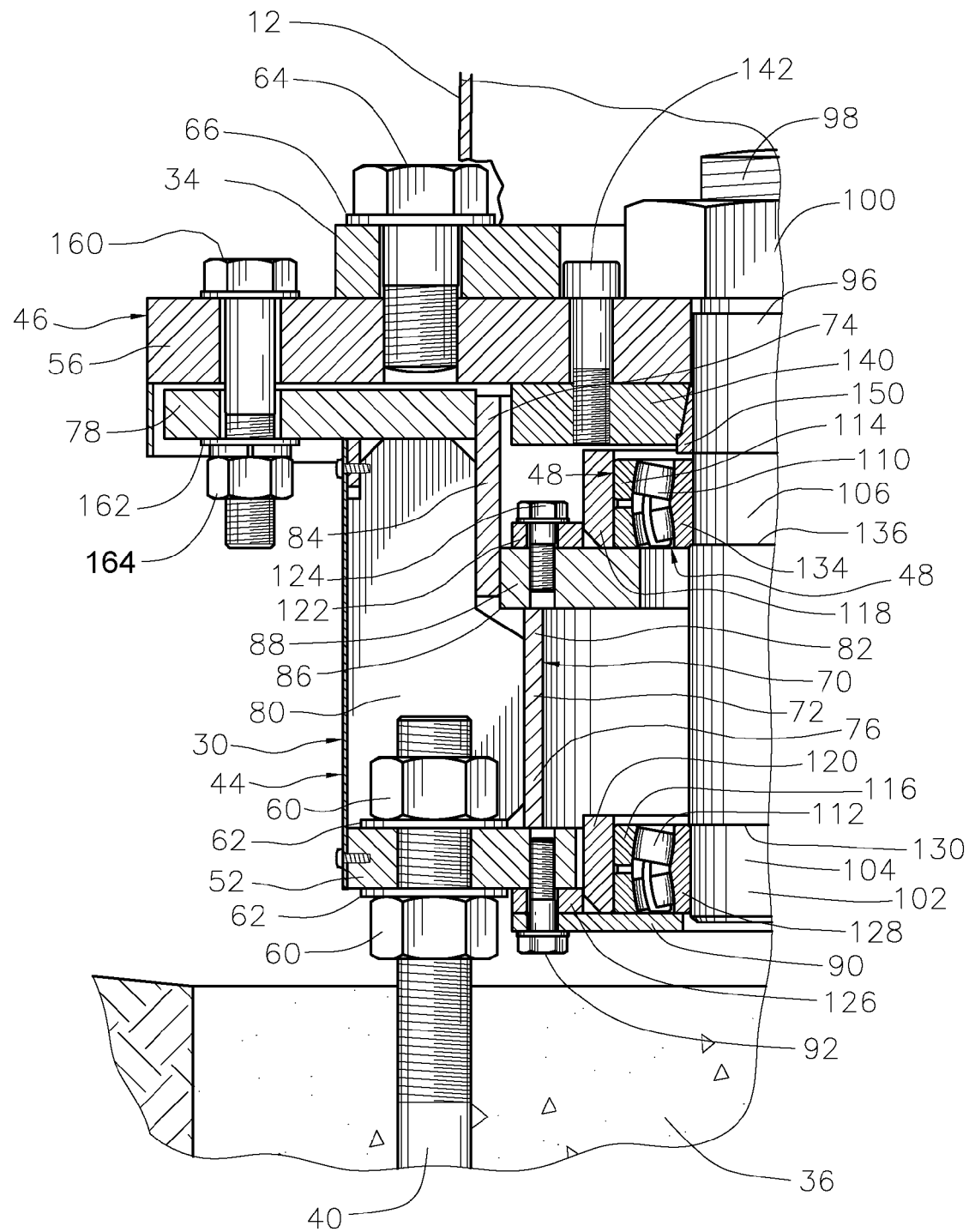
FIG. 5 shows an enlarged sectional view of the pivot assembly in FIG. 3. The electrical wiring and it conduit, which typically extend up through the center of the foundation, have been removed to simplify the illustration.
Figure 6:
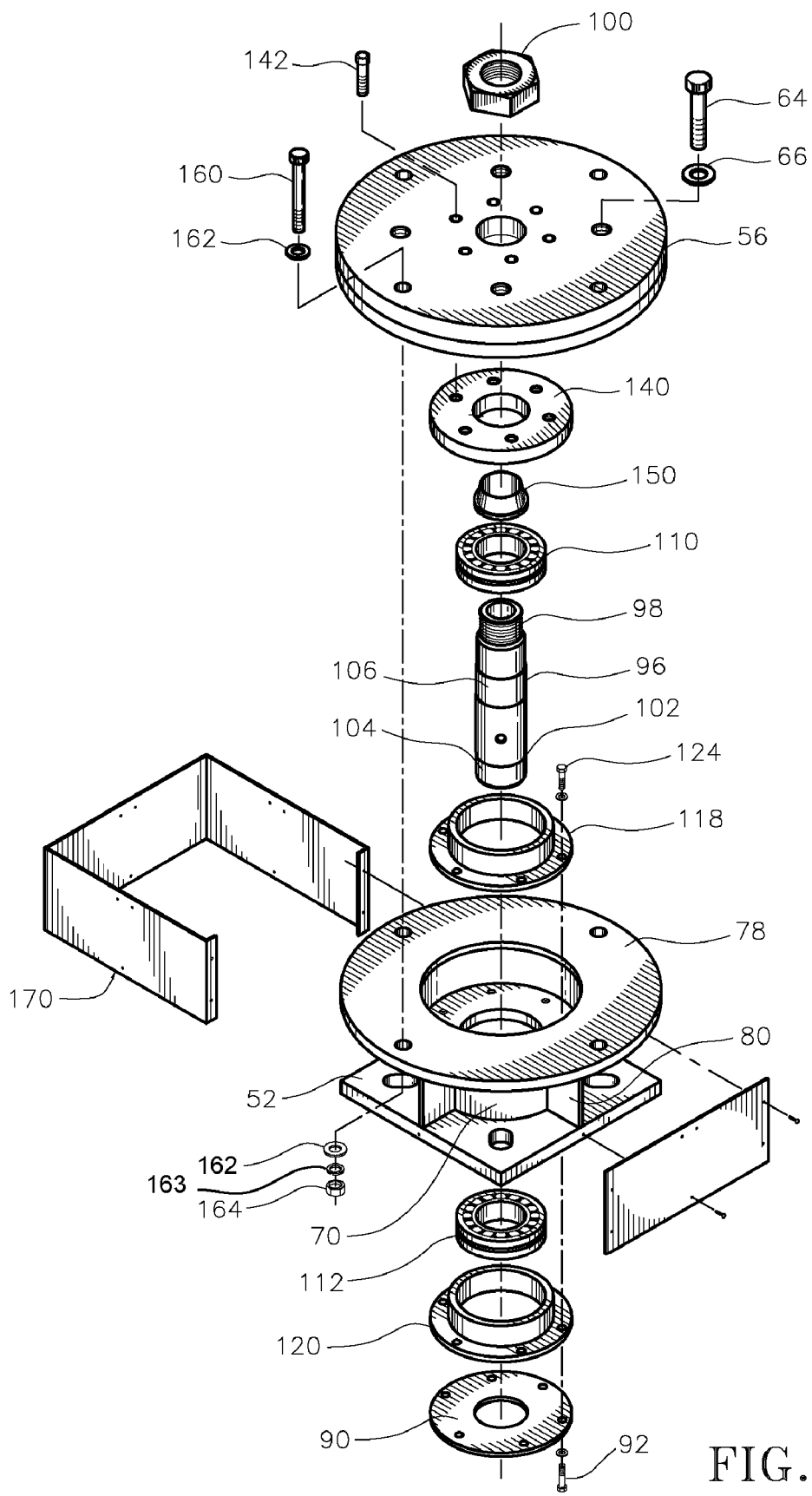
FIG. 6 is an exploded assembly drawing of the pivot assembly, including the cover.

With reference now to FIGS. 4-6, a preferred embodiment of the pivot assembly 30 will be described. Generally, the pivot assembly 30 comprises a stationary or base assembly designated generally at 44 and rotating or turntable assembly designated generally at 46. The base assembly 44 is nonmovably mounted to the foundation 36. The rotating assembly 46 is nonmovably mounted to the traffic pole 12 and rotatingly mounted on the base assembly 44. Preferably, the rotating assembly 46 is mounted to the base assembly 44 by means of a bearing assembly 48. In this way, when the pivot assembly 30 is installed between the base plate 34 of the traffic pole 12 and the foundation 36, the traffic pole is rotatable relative to the foundation, as illustrated in FIG. 2.

More preferably, the bearing assembly 48 comprises one or more roller bearings. As used herein, "roller bearing" refers to any one of numerous types of roller-element bearings, including spherical, cylindrical, symmetrical, asymmetrical and tapered. In the preferred construction, the bearing assembly 48 is contained substantially between the base plate 34 of the traffic pole 12 and the foundation 36. In other words, the bearing assembly 48 does not extend substantially down into the foundation 36 or up into the pole 12.

In the preferred pivot assembly 30, the base assembly 44 comprises a bottom plate 52 for connecting the pivot assembly to the foundation 36. In most instances, the bottom plate 52 will be configured with four bolt holes to receive the anchor bolts 40 in the foundation. While it may be any shape, a square shape is preferred.

The rotating assembly 44 comprises a top plate 56 for connecting the pivot assembly to the base plate 34 of the traffic pole 12. Like the bottom plate 52, the top plate 56 preferably has bolt holes sized and positioned to correspond to the bolt holes in the base plate 34 of the typical traffic pole 12. In this way, the pivot assembly 30 may be retrofitted into an existing standard traffic pole and foundation without modification to either.

The hex nuts 60 and washers 62 originally provided in the traffic control assembly 10 may be used to attach the bottom plate 52 to the anchor bolts 40 in the foundation 36. A plurality of hex headed bolts 64 and washers 66 may be included in the assembly for attaching the top plate 56 to the base plate 34 of the traffic pole 12.

The base assembly 44 preferably includes a body 70 having a tubular sidewall 72 with first or upper end 74 and a second or lower end 76. As used herein, "upper" denotes a direction furthest from the ground in the installed traffic control assembly 10. Similarly, "lower" refers to the direction closest to the ground in the installed traffic control assembly 10.

The second or lower end 76 of the sidewall 72 is adjacent the bottom plate 52 and an annular flange 78 extends outwardly from sidewall near the first end 74. For added strength, the body may include one or more gussets 80 extending between the sidewall 72 and the bottom plate.

For a reason that will become apparent, the sidewall 72 may comprise a lower section 82 and an upper section 84, where the upper section has a larger diameter than the lower section. Supported on the shoulder 86 formed between the upper and lower sections of the sidewall is an inwardly extending annular shelf 88. Another annular shelf 90 may be included at the first or lower end of the sidewall 72. In this embodiment, the upper shelf 88 is welded to the body 70, while the lower shelf is attached to the bottom plate 52 by a plurality of bolts 92. However, alternative fixation means should be readily apparent.

The rotating assembly 46 comprises a hollow or tubular shaft 96 with a threaded upper or first end 98 receivable through the central opening in the base plate 34 of the traffic pole 12. A hex nut 100 is provided to engage the upper end 98 above the top plate 56. The length of the shaft 96 is selected to extend through the body 70 of the base assembly 44. The lower or second end 102 of the shaft 96 may have a first bearing receiving section 104 of slightly smaller diameter. A second bearing receiving section 106, also of slightly smaller diameter, is included between the first and second ends.

First and second bearings, preferably upper and lower bearings 110 and 112, are provided in the pivot assembly 30. As mentioned previously, the bearings preferably are contained substantially within the pivot assembly and preferably are roller element type bearings, referred to herein simply as roller bearings. In the preferred embodiment, the bearing elements are spherical roller bearings, but other shapes may be used.

The outer races 114 and 116 are supported on the upper and lower shelves 88 and 90 inside upper and lower bearing housings 118 and 120. The upper bearing housing 118 has an annular flange 122 attached by bolts 124 to the upper annular shelf 88. The lower bearing housing 120 has an annular flange 126 attached by the bolts 92 to both the lower shelf 90 and bottom plate 52.

Now it will be seen that the upper aspect of the inner race 128 on the lower bearing 112 engages the shoulder 130 formed at the upper end of the bearing receiving section 104 on the shaft 96. Thus, the inner race 128 is captured between the shoulder 130 above and the lower shelf 90 below, fixing the inner race on the shaft 96.

Figure 7:
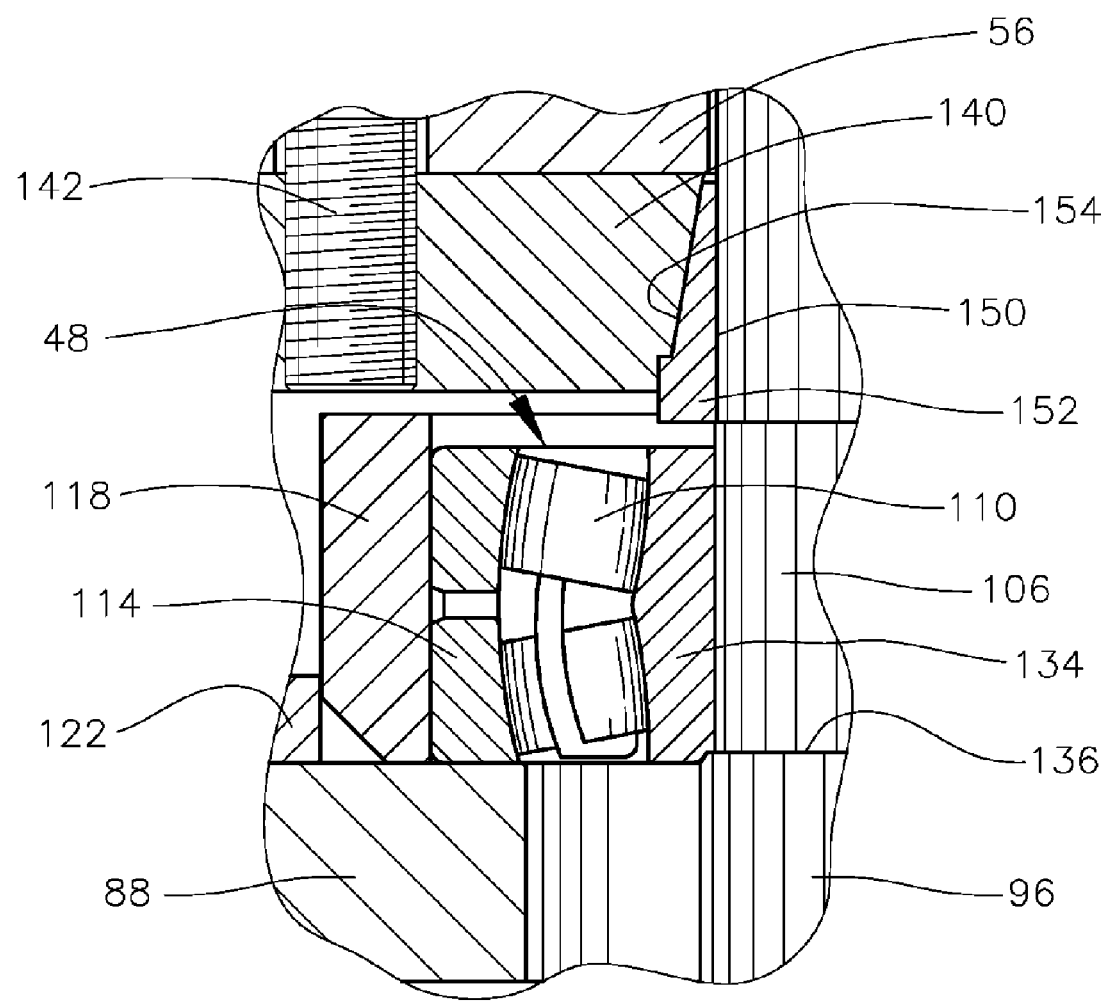
FIG. 7 is a further enlarged, sectional view showing the taper lock engagement between the shaft and the inner race of the upper bearing created by the spacer ring.

The lower aspect of the inner race 134 of the upper bearing 110 rests on the shoulder 136 formed by the upper bearing receiving section 106 on the shaft 96. An annular hub plate 140 is attached by bolts 142 to the bottom of the top plate 56. The hub plate 140 has a diameter small enough to be received inside the upper section 84 of the tubular sidewall 72 in the body 70 and a thickness sized to approach but not engage the upper edge of the bearing housing 118 (see FIG. 7).

The upper aspect of the inner race 134 of the upper bearing 110 is captured under the hub plate 140 by a spacer ring 150. The shape and function of the spacer ring 150 is shown best in FIG. 7, to which attention now is directed. The spacer ring 150 generally is formed to provide a taper lock between the shaft 96 and the top plate 56 fixed to the hub plate 140. The preferred spacer ring 150 for this purpose comprises a tubular member with an annular edge 152 around its lower end. The outer aspect of the upper portion 154 is tapered slightly upward from the step formed by the edge 152 to engage a complementary inner surface on the hub plate.

Thus, downward pressure (from the traffic pole, etc.) is transferred through the base plate 34 of the pole, through the top plate 56 to the hub plate 140, which urges the tapered portion of the spacer ring 150 against the shaft 96. The inner bearing race 134 is pushed into the shoulder 136 of the shaft 96 capturing the inner race between the shoulder and the edge 152 of the spacer ring 150. This will provide a frictional engagement between the shaft 96 and the rotating assembly 46.

At the same time, the outer race 114 of the upper bearing 110 remains frictionally fixed to the bearing housing 118, which is in turn fixed to the shelf 88 of the base assembly 44. The downward pressure also forces the shoulder 130 of the lower bearing receiving section 104 of the shaft 96 down against the inner race 128 of the lower bearing 112, so that it will rotate with the shaft. The outer race 116 frictionally engages the bearing housing 120, which is fixed to the lower shelf 90 and the bottom plate 52. Thus, the inner races 134 and 128 of the bearings 110 and 112 are fixed relative to the shaft 96 for rotation therewith, and the outer races 118 and 120 are fixed relative to the bottom plate 52 to remain stationary, whereby the rotating assembly 46 is rotatable relative to the base assembly 46 and the pole foundation 36 to which it is secured.

When assembled and installed, the top plate 56 of the rotating assembly 46 is supported immediately over the annular flange 78 of the base assembly 44. However, the various components are sized to provide adequate clearance therebetween to permit relative rotation. Some means preferably is included for securing the base assembly 44 and the rotating assembly 46 together to prevent rotation when the traffic pole is in its operating position or its servicing position (see FIG. 2) and movement must be avoided. To that end, the top plate 56 and the annular flange 78 may be provided with a plurality of aligned holes for receiving bolts 160, with flat washers 162, lock washers 163, and nuts 164. A cover 170 may be applied around the assembly 30.

Having described one preferred construction of the pivot base assembly 30, its use and operation now will be explained. Because the top and bottom plates 56 and 52 are configured to conform to existing pole bases 34 and foundations 36, respectively, the assembly 30 can be retrofitted to previously installed traffic poles or can be sold with new poles as original equipment.

When installed on existing poles, the procedure begins by accessing and disconnecting any electrical wires supplying the traffic devices 16 through the hand hole compartment 172 (FIG. 1). Next, the nuts 60 are removed from the base 34 of the pole 12 and the pole is lifted a distance off the foundation 36. The pivot base assembly 30, with the rotation assembly 46 bolted to the base assembly 44, is positioned over the foundation 36 and the wires are fed up through the center of the hollow shaft 96. Next, the base 34 of the pole 12 is positioned over the top plate 56 and the wires are pulled up through the pole and reconnected to the traffic control devices 16 and 18.

With the pivot base assembly 30 in position, the nuts 60 are placed on the anchor bolts 40 above and below the bottom plate 52 to secure the base assembly 44 to the foundation. Then, the bolts 64 and washers 66 are used to secure the base plate 34 to the top plate 56 of the rotating assembly 46. If the mast arm 14 is not already in the desired position, the bolts 160 are removed to permit rotation, and the pole 12 is rotated until the mast arm is properly positioned. Then the bolts 160, nuts 166 and washers 164 are replaced to complete the installation.

When repair or service of traffic devices 16 is necessary, the bolts 160 are removed and the pole 12 is turned until the mast arm 14 is supporting the devices in a safe position, such as over the right of way or adjacent side walk instead of over the roadway. In most instances, the bolts 160 are reattached while the service or repair work is conducted to prevent the mast arm from moving inadvertently. Once repairs are completed, the bolts 160 are removed, the mast arm 14 is repositioned over the roadway, and the bolts are replaced, returning the entire traffic control assembly 10 to its secure operating position.

Now it will be appreciated that the pivot base assembly of this invention allows fast and convenient repositioning of a traffic signals and other devices for servicing and repair without requiring interruption of traffic. The bearing assembly utilized in this invention is contained substantially within the pivot assembly and therefore does not interfere with the wiring typically accessed through a hand hole near the base of the traffic pole. In addition, the bearing assembly rotates easily with relatively little pressure, eliminating the need for winches or other mechanical assistance. Another significant advantage is the ability to retrofit the assembly into existing traffic poles.

Changes can be made in the combination and arrangement of the various parts and elements described herein without departing from the spirit and scope of the invention as defined in the following claims.

What is claimed is:

1. A pivot assembly for use with a traffic pole having a base plate supportable on a grounded pole foundation, the pivot assembly comprising:
    a bottom plate nonmovably connectable to the pole foundation;
    a top plate nonmovably connectable to the base plate of the traffic pole; and
    a bearing assembly substantially contained between the bottom plate and the top plate so that, when the pivot assembly is installed between the base plate and the pole foundation, the traffic pole is rotatable relative to the pole foundation, where the bearing assembly comprises:
        a shaft having first and second ends, wherein the first end is nonrotatably fixed to the top plate;
        a first bearing having an inner and an outer race, the outer race fixed relative to the bottom plate, and the inner race fixed relative to the shaft; and
        a second bearing having an inner and an outer race, the outer race fixed relative to the bottom plate, and the inner race fixed relative to the shaft;
        wherein the first and second bearings are spaced a distance apart along the shaft and wherein the outer race of each of the first and second bearings is independently supported by the bottom plate.

2. The pivot assembly of claim 1 wherein the pole foundation comprises a plurality of upwardly extending bolts, wherein the base plate of the pole includes bolt holes sized and positioned to receive the bolts in the foundation, wherein the bottom plate is configured to receive the bolts of the foundation, wherein the top plate has bolt holes corresponding to the bolt holes in the base plate of the pole.

3. The pivot assembly of claim 2 further comprising a plurality of bolts for connecting the base plate of the pole to the top plate of the pivot assembly.

4. The pivot assembly of claim 1 wherein each of the first and second bearings comprises spherical roller bearing elements.

5. The pivot assembly of claim 1 wherein the top plate is fixed to the shaft by a taper lock comprising a spacer ring captured between the top plate and the first bearing.

6. The pivot assembly of claim 5 further comprising a body having a tubular side wall with first and second ends, the second end adjacent the bottom plate, the body further comprising an annular flange extending from the first end, wherein the spacer ring further is dimensioned to support the top plate a distance above the annular flange of the body.

7. A traffic control assembly for use with a grounded pole foundation, the assembly comprising:
- a pole having a base plate;
- a traffic control device supported on the pole; and
- a pivot assembly comprising:
  - a bottom plate nonmovably connectable to the pole foundation;
  - a top plate nonmovably connectable to the base plate of the pole; and
  - a bearing assembly substantially contained between the bottom plate and the top plate, so that, when the pivot assembly is installed between the base plate and the pole foundation, the traffic pole is rotatable relative to the pole foundation, where the bearing assembly comprises:
    - a shaft having first and second ends, wherein the first end is nonrotatably fixed to the top plate;
    - a first bearing having an inner and an outer race, the outer race fixed relative to the bottom plate, and the inner race fixed relative to the shaft; and
    - a second bearing having an inner and an outer race, the outer race fixed relative to the bottom plate, and the inner race fixed relative to the shaft;
    - wherein the first and second bearings are spaced a distance apart along the shaft and wherein the outer race of each of the first and second bearings is independently supported by the bottom plate.

8. The traffic control assembly of claim 7 wherein the pole foundation comprises a plurality of upwardly extending bolts, wherein the base plate of the pole includes bolt holes sized and positioned to receive the bolts in the foundation, wherein the bottom plate of the foundation is configured to receive the bolts of the foundation, wherein the top plate of the pivot assembly has bolt holes corresponding to the bolt holes in the base plate of the pole.

9. The traffic control assembly of claim 8 further comprising a plurality of bolts for connecting the base plate of the pole to the top plate of the pivot assembly.

10. The traffic control assembly of claim 7 wherein each of the first and second bearings comprises spherical roller bearing elements.

11. The traffic control assembly of claim 1 wherein the top plate is fixed to the shaft by a taper lock comprising a spacer ring captured between the top plate and the first bearing.

12. The traffic control assembly of claim 11 further comprising a body having a tubular side wall with first and second ends, the first end adjacent the bottom plate, the body further comprising an annular flange extending from the side wall near the second end, wherein the spacer ring further is dimensioned to support the top plate a distance above the annular flange of the body.

13. A pivot assembly for use with a traffic pole having a base plate and a pole foundation, the pivot assembly comprising:
- a bottom plate nonmovably connectable to the pole foundation;
- a top plate nonmovably connectable to the base plate of the traffic pole; and
- a roller bearing assembly interposed between the bottom plate and the top plate, so that, when the pivot assembly is installed between the base plate and the pole foundation, the traffic pole is rotatable relative to the pole foundation, where the bearing assembly comprises:
  - a shaft having first and second ends, wherein the first end is nonrotatably fixed to the top plate;
  - a first bearing having an inner and an outer race, the outer race fixed relative to the bottom plate, and the inner race fixed relative to the shaft; and
  - a second bearing having an inner and an outer race, the outer race fixed relative to the bottom plate, and the inner race fixed relative to the shaft;
  - wherein the first and second bearings are spaced a distance apart along the shaft and wherein the outer race of each of the first and second bearings is independently supported by the bottom plate.

14. The pivot assembly of claim 13 wherein the pole foundation comprises a plurality of upwardly extending bolts, wherein the base plate of the pole includes bolt holes sized and positioned to receive the bolts in the foundation, wherein the bottom plate of the foundation is configured to receive the bolts of the foundation, wherein the top plate of the pivot assembly has bolt holes corresponding to the bolt holes in the base plate of the pole.

15. The pivot assembly of claim 14 further comprising a plurality of bolts for connecting the base plate of the pole to the top plate of the pivot assembly.

16. The pivot assembly of claim 13 wherein the top plate is fixed to the shaft by a taper lock comprising a spacer ring captured between the top plate and the first bearing.

17. The pivot assembly of claim 16 further comprising a body having a tubular side wall with first and second ends, the first end adjacent the bottom plate, the body further comprising an annular flange extending from the side wall near the second end, wherein the spacer ring further is dimensioned to support the top plate a distance above the annular flange of the body.

18. The pivot assembly of claim 13 wherein each of the first and second bearings comprises spherical roller bearing elements.

19. A traffic control assembly for use with a grounded pole foundation, the assembly comprising:
- a pole having a base plate;
- a traffic control device supported on the pole; and
- a pivot assembly comprising:
  - a bottom plate nonmovably connectable to the pole foundation;
  - a top plate nonmovably connectable to the base plate of the pole; and
  - a roller bearing assembly substantially contained between the bottom plate and the top plate so that, when the pivot assembly is installed between the base plate and the pole foundation, the traffic pole is rotatable relative to the pole foundation, where the bearing assembly comprises:
    - a shaft having first and second ends, wherein the first end is nonrotatably fixed to the top plate;
    - a first bearing having an inner and an outer race, the outer race fixed relative to the bottom plate, and the inner race fixed relative to the shaft; and
    - a second bearing having an inner and an outer race, the outer race fixed relative to the bottom plate, and the inner race fixed relative to the shaft;
    - wherein the first and second bearings are spaced a distance apart along the shaft and wherein the outer race of each of the first and second bearings is independently supported by the bottom plate.

20. The traffic control assembly of claim 19 wherein the pole foundation comprises a plurality of upwardly extending bolts, wherein the base plate of the pole includes bolt holes sized and positioned to receive the bolts in the foundation, wherein the bottom plate of the foundation is configured to receive the bolts of the foundation, wherein the top plate of the pivot assembly has bolt holes corresponding to the bolt holes in the base plate of the pole.

21. The traffic control assembly of claim 20 further comprising a plurality of bolts for connecting the base plate of the pole to the top plate of the pivot assembly.

22. The traffic control assembly of claim 19 wherein the top plate is fixed to the shaft by a taper lock comprising a spacer ring captured between the top plate and the first bearing.

23. The traffic control assembly of claim 22 further comprising a body having a tubular side wall with first and second ends, the first end adjacent the bottom plate, the body further comprising an annular flange extending from the side wall near the second end, wherein the spacer ring further is dimensioned to support the top plate a distance above the annular flange of the body.

24. The traffic control assembly of claim 19 wherein each of the first and second bearings comprises spherical roller bearing elements.

25. The pivot assembly of claim 1 wherein one of the first and second bearings is disposed adjacent the first end of the shaft and wherein the other of the first and second bearings is disposed adjacent the second end of the shaft.

26. The traffic control assembly of claim 7 wherein one of the first and second bearings is disposed adjacent the first end of the shaft and wherein the other of the first and second bearings is disposed adjacent the second end of the shaft.

27. The pivot assembly of claim 13 wherein one of the first and second bearings is disposed adjacent the first end of the shaft and wherein the other of the first and second bearings is disposed adjacent the second end of the shaft.

28. The traffic control assembly of claim 19 wherein one of the first and second bearings is disposed adjacent the first end of the shaft and wherein the other of the first and second bearings is disposed adjacent the second end of the shaft.

29. The pivot assembly of claim 1 wherein the outer race of the first bearing is supported on a first annular shelf mounted to the bottom plate and wherein the outer race of the second bearing is supported on a second annular shelf mounted to the bottom plate so that forces impinging on the outer race of each of the first and second bearings are transferred to the bottom plate.

30. The pivot assembly of claim 29 wherein the first annular shelf is mounted above the bottom plate and second annular shelf is mounted below the bottom plate.

31. The traffic control assembly of claim 7 wherein the outer race of the first bearing is supported on a first annular shelf mounted to the bottom plate and wherein the outer race of the second bearing is supported on a second annular shelf mounted to the bottom plate so that forces impinging on the outer race of each of the first and second bearings are transferred to the bottom plate.

32. The traffic control assembly of claim 31 wherein the first annular shelf is mounted above the bottom plate and second annular shelf is mounted below the bottom plate.

33. The pivot assembly of claim 13 wherein the outer race of the first bearing is supported on a first annular shelf mounted to the bottom plate and wherein the outer race of the second bearing is supported on a second annular shelf mounted to the bottom plate so that forces impinging on the outer race of each of the first and second bearings are transferred to the bottom plate.

34. The pivot assembly of claim 33 wherein the first annular shelf is mounted above the bottom plate and second annular shelf is mounted below the bottom plate.

35. The traffic control assembly of claim 19 wherein the outer race of the first bearing is supported on a first annular shelf mounted to the bottom plate and wherein the outer race of the second bearing is supported on a second annular shelf mounted to the bottom plate so that forces impinging on the outer race of each of the first and second bearings are transferred to the bottom plate.

36. The traffic control assembly of claim 35 wherein the first annular shelf is mounted above the bottom plate and second annular shelf is mounted below the bottom plate.

\* \* \* \* \*